Dec. 11, 1923.
H. J. PARKER
1,476,916
COLLAPSIBLE RIM FOR TIRES
Filed Aug. 2, 1919   2 Sheets-Sheet 1
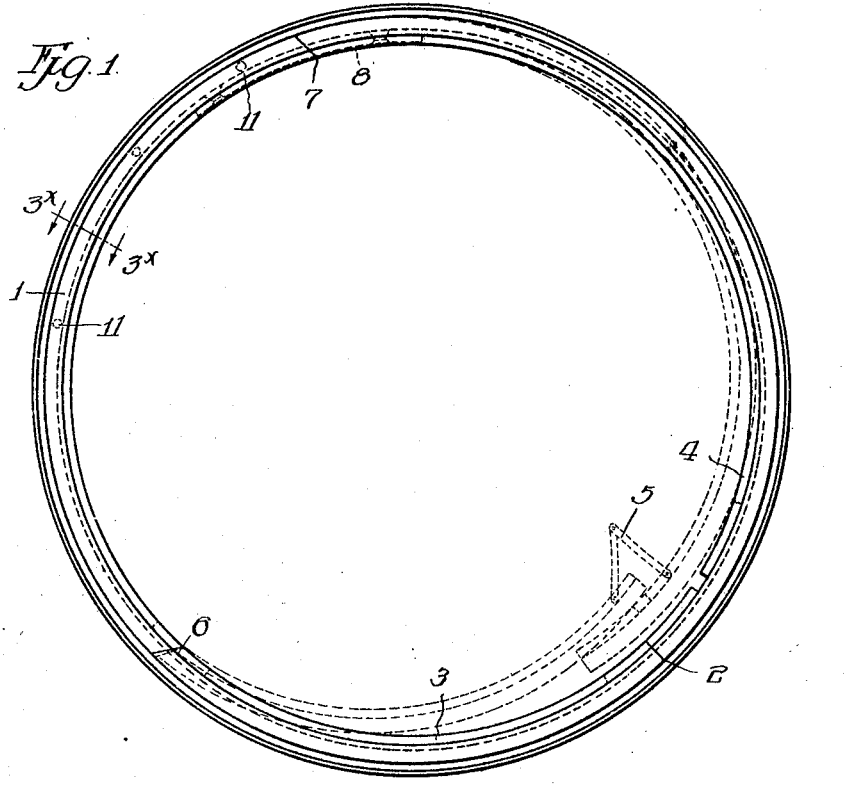
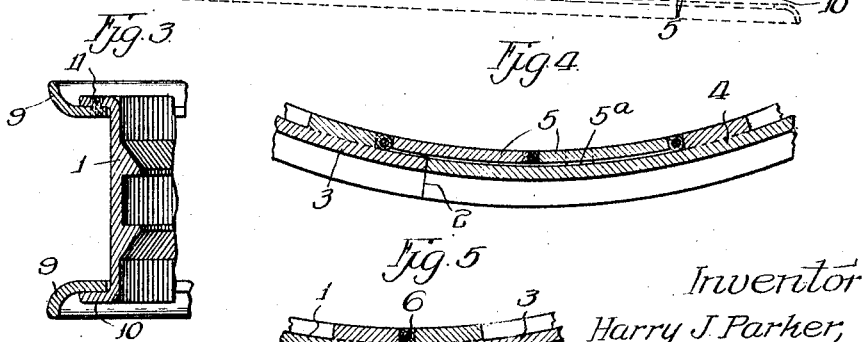
Witness:
R. Burkhardt
Inventor:
Harry J. Parker,
By Wilkinson & Huxley
Attys Dec. 11, 1923.                                              1,476,916
              H. J. PARKER
           COLLAPSIBLE RIM FOR TIRES
           Filed Aug. 2, 1919        2 Sheets-Sheet 2
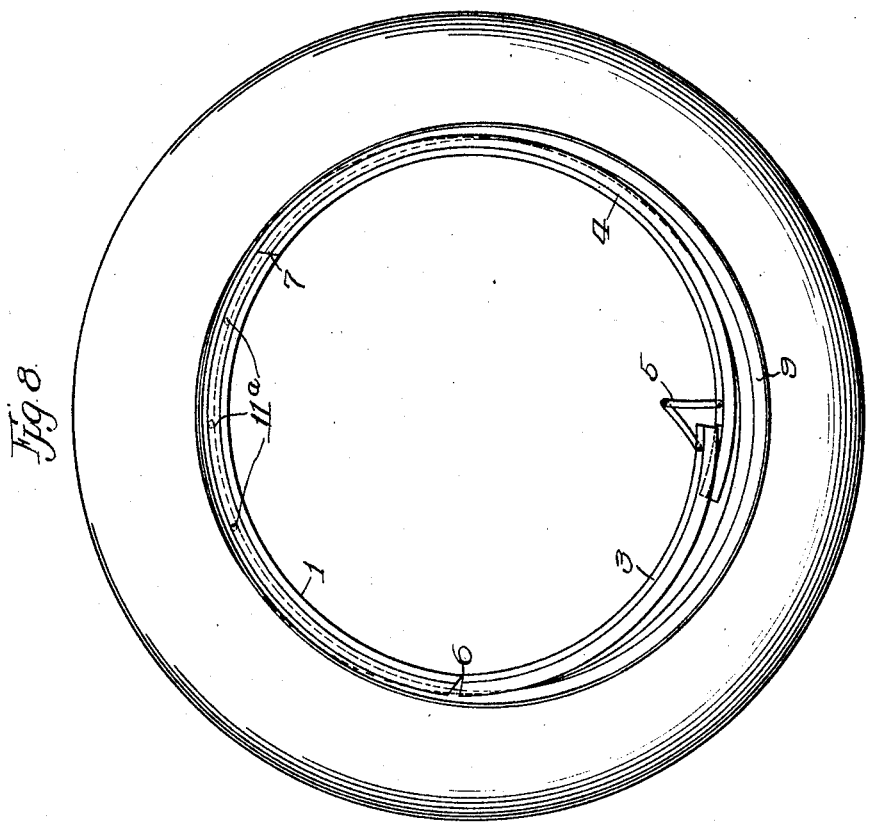
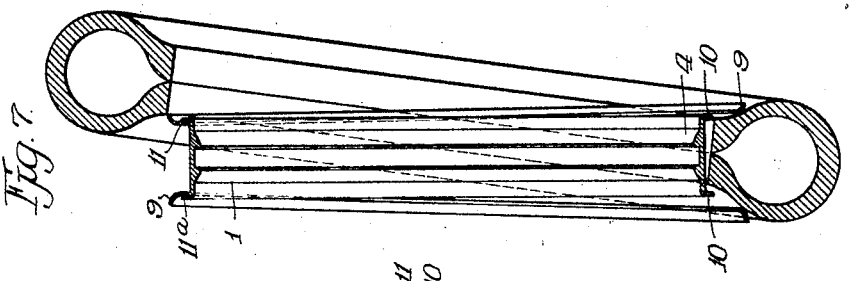
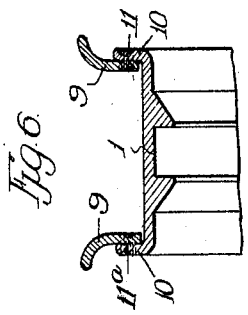
Inventor
Harry J. Parker, Patented Dec. 11, 1923.

1,476,916

UNITED STATES PATENT OFFICE.

HARRY J. PARKER, OF CHICAGO, ILLINOIS, ASSIGNOR TO PARKER COLLAPSIBLE RIM CORPORATION, OF CHICAGO, ILLINOIS, A CORPORATION OF DELAWARE.

COLLAPSIBLE RIM FOR TIRES.

Application filed August 2, 1919. Serial No. 314,971.

*To all whom it may concern:*

Be it known that I, HARRY J. PARKER, a citizen of the United States, residing at Chicago, in the county of Cook and State of Illinois, have invented certain new and useful Improvements in Collapsible Rims for Tires, of which the following is a specification.

This invention relates to improvements in the construction of rims, through means of which pneumatic or other resilient tires may be removably applied to vehicle wheels, and the invention has for its object to provide a rim which is collapsible to facilitate assembly and disassembly with the tire, but which is provided with continuous sustaining rings against which the collapsible portion is distended in order to sustain the rim against radial expansion while in use. Another object is to utilize, as sustaining rings, the flanges which confine the tire upon the rim, and to render one of the flanges removable, if desired, to facilitate assembly and disassembly with the tire. Another object is to so attach the sustaining flanges to one of the members of the rim that when the rim is collapsed the flanges will remain in their proper marginal planes with relation to the body of the rim and in close peripheral bearing upon the portion of the rim to which they are attached, and will remain spaced apart while protruding beyond the collapsed side of the rim; the flanges being thus adapted to be spread apart on opposite sides of the tire as the collapsed or distorted side of the rim is being brought into bearing upon the tire and the opposite or normal portion of the rim, with the attached flanges, is being brought into coincidence with the plane of the tire. Further objects relate to details of construction of parts whereby the above-mentioned major objects may be fully realized.

In the accompanying drawings—

Figure 1 is a side elevation of a demountable vehicle rim in which the several features of the present invention are embodied, the relations of the parts when the rim is collapsed being suggested by broken lines.

Figure 2 is a diametric section of the same.

Figure 3 is a radial section through the rim at a point in the circumference indicated by the line 3×—3× in Figure 1.

Figure 4 is a section of a portion of the rim in a medial circumferential plane perpendicular to the axis of the wheel, showing the relation of the distended toggle to the ends of the rim members which it connects.

Figure 5 is a detail view showing in circumferential section the joint employed between the main rim member and the collapsing section.

Figure 6 is a view similar to Figure 3 showing a modified construction of the rim in which both confining flanges are permanently attached to the main portion of the rim.

Figure 7 is a sectional view illustrating the method of assembling with the tire the construction of rim shown in Figure 6; and Figure 8 is a side elevation of the rim and the tire, the construction of the rim and the relation of the members being as shown in Figure 7.

Referring to Figures 1 to 5, 1 represents the body of a demountable rim, which may be of any approved construction so far as concerns its section or the form which adapts it to be mounted upon a wheel. This rim is divided in a radial axial plane at 2 so as to provide free ends 3 and 4, which are adapted to overlap, as suggested in Figure 1, and permit the rim to collapse and thereby reduce its diameter sufficiently to admit of its ready assembly or disassembly with the tire; a toggle lever 5 being introduced between these separable and overlapping ends for the purpose of retaining the ends to normal circumferential position (Figure 4), and thereby distending the rim within the tire in the act of assembly. The body of the rim is further subdivided, preferably at 6, where a hinge joint (see also Figure 5) is provided to facilitate collapsing, and also at 7 where a connecting spring 8 is provided and given a permanent initial set that tends to enforce collapsing of the rim body whenever the ends 3 and 4 are relatively displaced.

In order to radially sustain a rim that has been divided for the purpose of rendering it collapsible, the present invention provides continuous or unbroken rings which surround the periphery of the body portion of the rim and limit radial expansion of the rim under any of the forces to which it is subjected in use, such as the securing wedges which enter between the rim and the felly of the wheel, centrifugal force developed under high speed of travel, or local distention at one or more points that may result from severe impact with an obstruction upon the surface over which the wheel is traveling. This is preferably accomplished by making the tire-confining flanges 9 in the form of continuous rings, and having these free from the body portion of the rim to a circumferential extent at least sufficient to permit the collapsing portion of the rim to move radially inward and outward relatively to the confining flanges; these confining flanges 9 being sustained against lateral displacement under the expansion of the tire by means of circumferential lips 10 on the body portion of the rim. At least one of the flanges 9 will preferably be permanently attached to the body portion through a limited circumferential extent thereof, as, for instance, by spot-welds 11 (see also Figure 3) connecting the flange 9 to the lip 10, and this will retain the flange permanently in proper relation to the body of the rim. The other flange 9 may be left free so that when the body of the rim is collapsed the flange may be removed from the rim, as suggested by dotted lines in Figure 2, and the passage of the rim to and from the annulus of the tire would be thereby facilitated.

As shown in Figures 6 to 8, both the flanges 9 may be permanently attached to the body portion 1 of the rim, as, for instance, by spot-welds 11, 11ª, and the rim assembled or disassembled with the tire by outward radial displacement of the confining flanges relatively to the tire, as suggested in Figure 7, until the collapsed or overlapped ends 3 and 4 come into bearing upon the tire, at which time the diametrically opposite portion of the rim will be in position to slip to or from the plane of the tire, as shown in Figure 7. During this operation the radial displacement or eccentricity of the rim relatively to the tire may be developed to a sufficient extent to permit slight shortening of the vertical diameter of the tire, and therefore enlargement of the horizontal diameter, in order to admit that portion of the rim in which the collapsing is less extensive.

An important feature of this embodiment, having both rings attached (Figures 6 to 8) and especially of the preferred construction thereof, consists in having the rings sufficiently freed by the collapsing portion of the ring to render them laterally yielding or spreading as well as radially displaceable beyond the collapsed portion, as suggested in Figure 7, so that they can readily pass down on opposite sides of the tire in assembly.

In either form of device, after the rim has been assembled with the tire, it is simply necessary to place the foot upon the knee of the toggle 5 and press the same to cause the end 3 to snap into circumferential alinement with the end 4, whereupon the rim will be firmly keyed within the tire, the tire confined against lateral displacement by the ring-flanges 9, and the whole rim sustained against radial enlargement, or held accurately to diametric gauge, by means of the rings which the flanges 9 afford. When it is desired to remove the rim from the tire, the tire being deflated, it will simply be necessary to introduce a tool beneath the toggle 5, as, for instance, by introducing a screw driver in the cavity 5ª of Figure 4 to raise the toggle, and then to bring inward radial pressure upon the rim, as, for instance, by jarring the tire at a point over the end 3, when the rim will automatically collapse within the tire and be readily removable therefrom.

I claim:

1. In a collapsible rim, a body portion divided radially and having ends relatively displaceable to render said body portion collapsible, means for restoring said ends to circumferential alinement for distending the rim, and a limiting ring surrounding said body portion and sustaining it against radial expansion; said limiting ring being permanently attached to the body portion through a limited circumferential extent thereof.

2. In a collapsible rim, a body portion constructed to be collapsed and distended to change its diameter for the purpose of assembly and disassembly with the tire and having circumferential sustaining lips, and limiting rings in the form of tire-confining flanges surrounding said body portion and sustained by said lips, each of said rings being permanently attached to the body portion of the rim through a limited circumferential extent thereof.

3. In a collapsible rim, the combination of a body portion constructed to collapse at a circumferential portion thereof, and unbroken limiting rings in the form of tire-confining flanges which sustain the rim against radial expansion when the rim is in distended condition; said rings being permanently attached to the body portion at points circumferentially remote from the collapsing portion thereof; one of said rings being adapted to yield laterally when released by the collapsed portion to increase the space into which the tire is received between the rings.

4. In a collapsible rim, the combination of a body portion constructed to collapse at a circumferential portion thereof, and unbroken limiting rings in the form of tire-confining flanges which sustain the rim against radial expansion when the rim is in distended condition; said rings being permanently attached to the body portion at points circumferentially remote from the collapsing portion thereof; the collapsing portion of the rim releasing the corresponding portions of the confining rings and permitting them to spread and receive the tire between them.

Signed at Chicago, Illinois, this 17th day of July, 1919.

HARRY J. PARKER.